March 25, 1947.  B. E. MONTGOMERY  2,418,084
ANTENNA
Filed Nov. 5, 1945   2 Sheets-Sheet 1
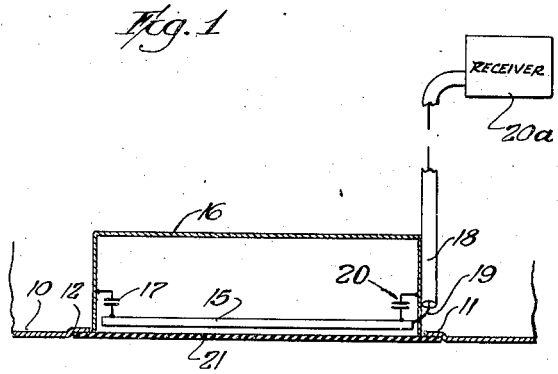
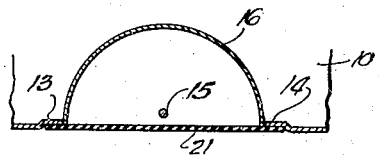
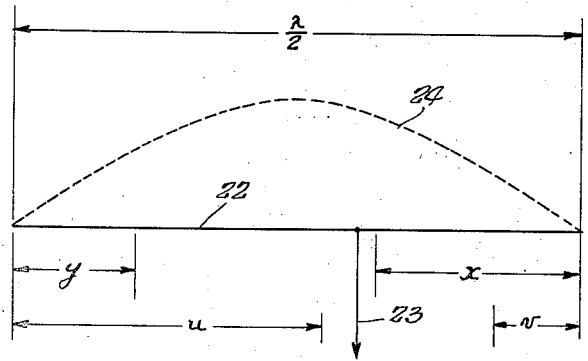
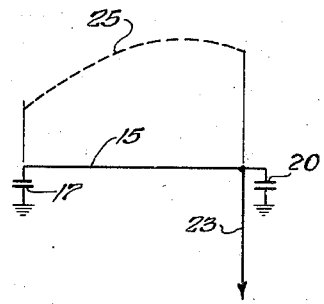
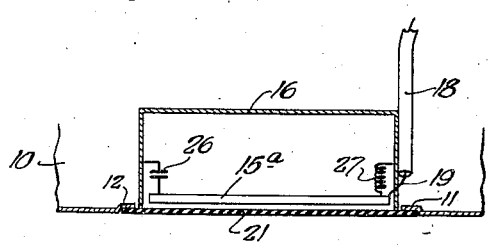
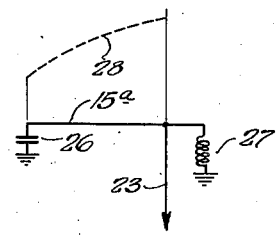
Inventor.
Bruce E. Montgomery March 25, 1947. B. E. MONTGOMERY 2,418,084
ANTENNA
Filed Nov. 5, 1945 2 Sheets-Sheet 2
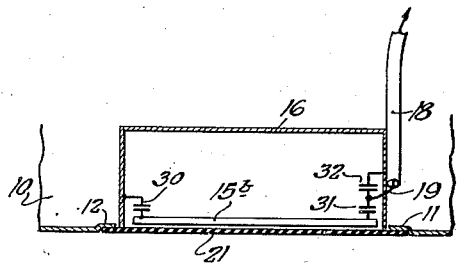
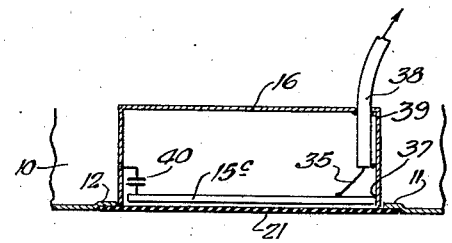
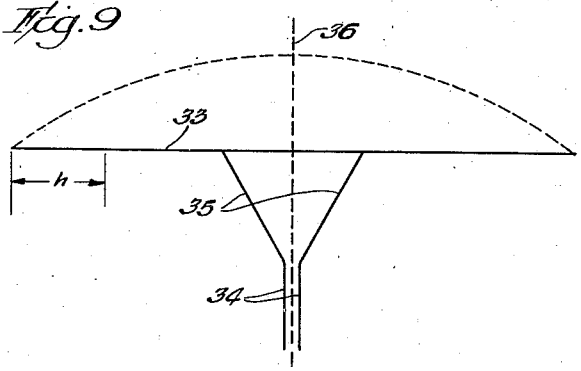
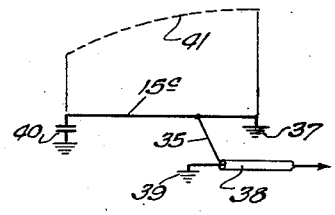
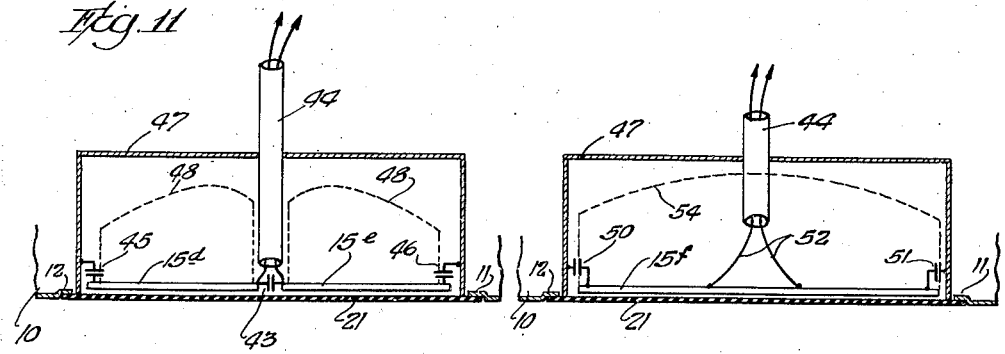
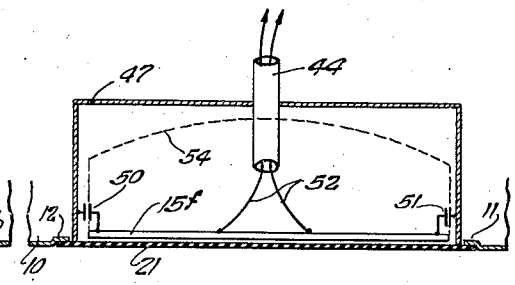
Inventor:
Bruce E. Montgomery Patented Mar. 25, 1947

2,418,084

UNITED STATES PATENT OFFICE 2,418,084

ANTENNA

Bruce E. Montgomery, Berwyn, Ill., assignor to United Air Lines, Inc., Chicago, Ill., a corporation of Delaware Application November 5, 1945, Serial No. 626,875

13 Claims. (Cl. 250—33)

This invention relates to antennas, more particularly to air-borne or aircraft antennas, and the invention has for an object the provision of improved antennas of this character.

Although the invention is not limited thereto, it is particularly adapted for use as and will be described as embodied in an aircraft antenna for the reception of 75 megacycle marker signals. Antennas embodying the invention, however, may be used for other purposes, may be employed for transmitting as well as receiving, and may be operated at frequencies other than 75 megacycles.

Marker antennas on aircraft are adapted to receive radiation directed upwardly from a suitable transmitter on the ground. This radiation is at a maximum in an upwardly direction and the receiving antenna on the aircraft should have a pattern with a maximum pickup downwardly from the aircraft. Furthermore, the antenna pattern should be approximately symmetrical fore and aft along the line of flight. A common type of marker antenna in use on commercial and military aircraft consists of a half-wave dipole approximately 80 inches long which is mounted about 7 inches from the metal skin of the aircraft and on the fuselage centerline running fore and aft. Ordinarily the antenna is connected to a proper receiver within the aircraft through a coaxial transmission line, either by breaking the dipole at the center and connecting the inner conductor and the transmission line sheath to the two antenna halves respectively, or by connecting a single open wire to an unbroken dipole about 5 inches off center, the other end of the open wire being connected to the inner conductor of the transmission line at the metal skin of the aircraft, the outer sheath of the transmission line being grounded to the metal skin.

Half-wave dipole antennas of this character are unwieldy and when mounted as indicated above are not only subject to breakage or failure under the forces encountered in take-off and landing, but also exert considerable drag by reason of the fact that they project into the air stream. It is a further object of this invention to provide a short aircraft antenna disposed entirely within the aircraft so as not to project into the air stream, which antenna will have a maximum pickup in the desired direction, and which effects satisfactory pickup of the transmitted radio energy.

In carrying out the invention in one form a short rod-like antenna element is disposed within the aircraft opposite an opening in the metal skin of the aircraft, and a substantially semi-cylindrical metallic structure is disposed around the antenna element with its open side facing the opening and is grounded to the metal skin to form a reflector and shield. A suitable transmission line is provided for connecting the antenna element to a suitable energy-translating device, such as a receiver or transmitter, within the aircraft, and a cover sheet of nonmetallic material is disposed in the opening in substantially coplanar relation with the metal skin to close the opening and provide a smooth air-flow surface without interfering with the efficiency of the antenna. Preferably, the antenna element is electrically short with respect to the wave length at which it is intended to operate, and impedance loading means are connected to the element at one or both ends thereof to cause the antenna element to be resonant at the desired frequency, the impedance means being so selected as to cause the antenna to present to the transmission line a resistance equal to the characteristic impedance of the line.

For a more complete understanding of the invention, reference should now be had to the drawings, in which:

Fig. 1 is a longitudinal sectional view taken along the median vertical plane of an aircraft-mounted antenna embodying the present invention, only a portion of the metal skin of the aircraft being shown;

Fig. 2 is a transverse sectional view of the antenna shown in Fig. 1;

Fig. 3 is a diagram of a conventional half-wave dipole antenna connected to a single wire transmission line;

Fig. 4 is a diagram indicating the manner in which the dipole of Fig. 3 is modified in producing the antenna of Figs. 1 and 2;

Fig. 5 is a longitudinal sectional view similar to Fig. 1 showing a modified form of antenna embodying the present invention;

Fig. 6 is a diagram illustrating the relation of the antenna of Fig. 5 to the conventional half-wave dipole of Fig. 3;

Figs. 7 and 8 are longitudinal sectional views similar to Fig. 1 showing two additional antenna structures embodying the present invention;

Fig. 9 is a diagram illustrating a conventional half-wave dipole connected to a transmission line through a conventional Y connection;

Fig. 10 is a diagram illustrating the manner in which a portion of the dipole shown in Fig. 9 is modified to produce the antenna structure shown in Fig. 8; and

Figs. 11 and 12 are longitudinal sectional views similar to Fig. 1 showing still further embodiments of the invention.

Referring first to Figs. 1 to 4 of the drawings, the invention is shown as embodied in an airborne antenna adapted to be mounted within the metal skin 10 of a suitable aircraft, the skin having a substantially rectangular opening therein defined by the flanges 11, 12, 13 and 14. Disposed within the aircraft opposite the opening in the metal skin 10 is a rodlike antenna element 15, and a semicylindrical metallic member 16 is disposed around the rodlike element 15 with the open side of the member 16 facing the opening in the skin 10. The semicylindrical member 16 is preferably secured along its edges to the flanges 13 and 14 of the metal skin, thereby electrically grounding the member 16, which serves as a reflector and as a shield isolating the antenna element 15 from the inside of the aircraft.

As shown in Fig. 1, one end of the element 15 is connected to the grounded reflector 16 through a condenser 17 and the opposite end of the element is connected to the outer sheath 18 of a coaxial transmission line by a condenser 20, the said outer sheath 18 being grounded to the metallic reflector 16. In addition, the rodlike element 15 is connected to the inner conductor 19 of the transmission line, which serves to connect the element 15 to a suitable energy translating device 20a mounted within the aircraft. The device 20a is indicated in the drawings as a receiver but it may, of course, be a transmitter if desired. A cover sheet 21 formed of any suitable nonmetallic material is preferably disposed in front of the pickup element 15 to close the otherwise open side of the reflector 16. Such cover sheet may be secured to the flanges 11, 12, 13 and 14 in any desired manner and may be mounted with its outer surface flush with the outer surface of the skin 10 to maintain a streamlined surface, as shown, or if desired a separate nonmetallic cover sheet may be provided to close the skin opening and the antenna structure may be mounted in facing relation to the inner surface thereof.

When the antenna is used for the reception of 75-megacycle marker signals, the rod 15 may be approximately 20 inches long and the reflector 16 may have a radius of approximately 6 inches. In order that the antenna may be resonant so that maximum pickup is achieved, the condensers 17 and 20 are so proportioned as to produce resonance and at the same time cause the antenna to present to the transmission line a resistance substantially equal to the characteristic impedance of the line.

In a typical case this characteristic impedance may be 50 ohms and in actual installations the condensers 17 and 20 have been adjusted to approximately 5 micro-microfarads and 130 micro-microfarads, respectively. An antenna thus constructed delivers the maximum possible signal into the transmission line and represents the optimum adjustment condition.

The electrical operation of the antenna shown in Figs. 1 and 2 may be further explained by reference to Figs. 3 and 4. In Fig. 3 a conventional half-wave dipole antenna 22 is shown connected to a single-wire transmission line 23, the current distribution along the antenna being indicated by the broken line 24. In accordance with the present invention, the end sections of the antenna designated $x$ and $y$ in Fig. 3 may be removed and replaced by suitable condensers since each section is less than a quarter wave length long. In Fig. 4 there is illustrated diagrammatically the construction obtained by eliminating the antenna end sections $x$ and $y$ and replacing them by grounded condensers 17 and 20, the remaining portion of the antenna wire being identified by the reference numeral 15 to correspond to the rodlike element 15 of Figs. 1 and 2. The current distribution obtained as a result of these changes is indicated by the broken line 25. It will be apparent that if the single-wire transmission line 23 is now made the center conductor 19 of a concentric transmission line and if the condensers 17 and 20 are connected to the semicylindrical reflector 16, the antenna of Fig. 1 is obtained.

In Fig. 5 there is shown a modified form of antenna which is substantially identical with the antenna shown in Fig. 1, like parts being indicated by similar reference numerals, except that in the antenna of Fig. 5 the rod-like element 15 is replaced by a similar element 15a and the condensers 17 and 20 have been respectively replaced by a condenser 26 and an inductance 27.

Referring to Fig. 3, if the section $u$ is replaced by the inductance 27, which is necessary since this section $u$ is over a quarter of a wave length long, and if the section $v$ of the antenna is replaced by the condenser 26, as indicated diagrammatically in Fig. 6, a current distribution substantially as indicated by the broken line 28 in Fig. 6 will be obtained. When the single-wire transmission line 23 is made the center conductor 19 of the concentric transmission line and the inductance 27 is grounded to the shield 16 and the outer sheath 18 of the transmission line, the condenser 26 being likewise grounded to the reflector 16, the antenna of Fig. 5 is obtained.

The further embodiment of the invention shown in Fig. 7 involves substantially the same physical structure as has been described in connection with the embodiment of Fig. 1, the antenna element 15 of Fig. 1 being replaced by a similar element 15b, the condenser 17 being replaced by a condenser 30, and the condenser 20 of Fig. 1 being replaced by a pair of condensers 31 and 32 connected in series. The condenser 30 has a capacitance equal to the total capacitance of the condensers 31 and 32, the condenser 30 and the pair of condensers 31 and 32 in effect replacing equal-length end sections of the standard dipole illustrated in Fig. 3. As shown, the center conductor 19 of the concentric transmission line is connected at a point intermediate the condensers 31 and 32.

The particular advantage of the antenna construction shown in Fig. 7 lies in the current distribution obtained, the maximum current point occurring at the center of the element 15b, which is the most desirable current distribution. In order to adjust the antenna to resonance and at the same time present the desired resistance to the coaxial transmission line, it is necessary to adjust the condensers 31 and 32 to give a resistance across the condenser 32 which will match the characteristic impedance of the transmission line. In general it will be found that the condenser 32 will be larger than the condenser 31 for most practical combinations. In addition to the above adjustment, the total capacitance of the two condensers 31 and 32 in series must be maintained equal to the capacitance of the condenser 30 and the capacitance of the various condensers must be such as to produce resonance at the desired frequency. Consequently it will be clear that adjustment of the antenna of Fig. 7 is somewhat less simple than adjustment of the antenna of Fig. 1 and although the antenna of Fig. 7 gives more uniform current distribution, it has been found that the current distribution provided by the construction shown in Fig. 1 is entirely satisfactory and accordingly this construction is considered the preferred construction because of its simplicity.

Before turning to the further embodiment of the invention shown in Fig. 8, reference will first be made to Figs. 9 and 10 which diagrammatically illustrate the derivation of the antenna shown in Fig. 8. In Fig. 9 a standard half-wave dipole 33 is provided which is connected to a transmission line 34 by means of the conventional Y (or delta) connection 35, well known in the art. In an antenna of this type, a plane 36 passing through the center line of the antenna will be at ground potential. In order to produce the antenna of Fig. 8, the antenna is grounded at the center as represented by the ground connection 37 in Fig. 10. The left side of the Y connection 35 is connected to the center conductor of a coaxial transmission line, the outer conductor 38 of which is grounded as indicated by the ground connection 39 in Fig. 10. The entire right-hand half of the dipole 33 is removed and the left-hand end portion $h$ (Fig. 9) is replaced by a grounded condenser 40, as shown in Fig. 10. The current distribution obtained by virtue of this construction is indicated by the broken line 41 in Fig. 10.

Referring now to Fig. 8, it will be observed that the ground connections 37 and 39 are taken care of by respectively connecting the rodlike pickup element 15c and the outer sheath 38 of the coaxial transmission line to the metallic shield 16, and the condenser 40 at the opposite end of the antenna is likewise grounded by connection to this shield. A particular advantage of the antenna construction shown in Fig. 8 resides in the fact that only one condenser is required.

In Fig. 11 an embodiment of the antenna is shown in which the antenna is adapted to be connected to a balanced two-wire transmission line instead of the coaxial transmission lines employed in the previously described embodiments. In Fig. 11 a pair of rodlike antenna elements or pickup rods 15d and 15e of equal length are disposed in spaced end-to-end relation and a condenser 43 serves to connect the adjacent ends of these elements together. A two-wire balanced transmission line 44 which is connected to an energy translating device such as a receiver by means of a suitably balanced input circuit (not shown) having an impedance to match the line. Suitable condensers 45 and 46 connected to the outer ends of the elements 15d and 15e, respectively, are grounded to a metallic shield and reflector 47 similar to the previously described shield and reflector 16. The condensers 45 and 46 are of equal capacitance and the condenser 43 is ordinarily of greater capacity than either of the condensers 45 and 46. The current distribution obtained in this antenna is represented in Fig. 11 by the broken lines 48. It will be apparent upon consideration of Fig. 4 that the antenna construction illustrated in Fig. 11 is in effect two antennas of the type illustrated in Fig. 4 arranged in opposition.

In the embodiment of the invention shown in Fig. 12 a suitable pickup rod or antenna element 15f is provided within the shield or reflector 47, opposed ends of the pickup element being grounded to the reflector 47 through condensers 50 and 51 which are of equal impedance. A suitable two-wire balanced transmission line 44 is connected to the element 15f through the conventional Y (or delta) connection 52, the conductors of the delta connection being connected to the rod 15f at equal distances from the center of the element. The current distribution obtained with this antenna construction is represented diagrammatically in Fig. 12 by the broken line 54 and it will be observed that this embodiment of the invention constitutes merely a half-wave dipole employing the Y connection of Fig. 9 with suitable end sections of the dipole removed and replaced by the condensers 50 and 51, the remaining portion of the antenna element or pickup rod being disposed within the metallic shield and reflector 47.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. An antenna structure for an aircraft having a metal skin and an opening therein comprising antenna means disposed within said aircraft including an elongate antenna element supported opposite said opening, a substantially semicylindrical metallic structure surrounding said antenna means and grounded to said skin with the open side of said structure facing said opening to form a reflector and shield for said antenna means, and means including a transmission line for connecting said antenna means to a translating device within said aircraft.

2. An antenna structure for an aircraft having a metal skin and an opening therein comprising antenna means disposed within said aircraft including an elongate antenna element supported opposite said opening, a sheet metal semicylindrical member disposed about said antenna means and grounded to said skin with the open side thereof facing said opening to form a reflector and shield for said antenna means, means including a transmission line for connecting said antenna means to a translating device within said aircraft, and a cover sheet of nonmetallic material in said opening in substantially coplanar relation with said skin to close said opening and provide a smooth air-flow surface.

3. An antenna structure for an aircraft having a metal skin and an opening therein comprising antenna means disposed within said aircraft including an elongate antenna element supported opposite said opening, a substantially semicylindrical metallic structure surrounding said antenna means and grounded to said skin with the open side of said structure facing said opening to form a reflector and shield for said antenna means, means including a transmission line having an outer conductor grounded to said skin and an inner conductor coupled to said element for connecting said antenna means to a translating device within said aircraft, and a cover sheet of nonmetallic material in said opening in substantially coplanar relation with said skin to close said opening and provide a smooth air-flow surface.

4. An antenna structure for an aircraft having a metal skin and an opening therein, comprising an elongate antenna element disposed within said aircraft opposite said opening, a substantially semicylindrical metallic structure surrounding said element and grounded to said skin with the open side of said structure facing said opening to form a reflector and shield for said element, means including a transmission line for connecting said element to a translating device within said aircraft, impedance loading means connected to said element to render said element resonant at a predetermined frequency and to present to said transmission line a resistance substantially equal to the characteristic impedance of said transmission line, and a cover sheet of nonmetallic material in said opening in substantially coplanar relation with said skin to close said opening and provide a smooth air-flow surface.

5. An antenna structure for an aircraft having a metal skin and an opening therein, comprising an elongate antenna element disposed within said aircraft opposite said opening, a substantially semicylindrical metallic structure surrounding said element and grounded to said skin with the open side of said structure facing said opening to form a reflector and shield for said element, means for connecting said element to a translating device within said aircraft including a concentric transmission line having a grounded outer conductor and an inner conductor connected to said element, impedance loading means connected to said element to render said element resonant at a predetermined frequency and to present to said transmission line a resistance substantially equal to the characteristic impedance of said transmission line, and a cover sheet of nonmetallic material disposed over said opening in substantially coplanar relation with said skin to close said opening and provide a smooth air-flow surface.

6. An antenna structure for an aircraft having a metal skin and an opening therein, comprising an elongate antenna element disposed within said aircraft opposite said opening, a substantially semicylindrical metallic structure surrounding said element and grounded to said skin with the open side of said structure facing said opening to form a reflector and shield for said element, means for connecting said element to a translating device within said aircraft including a concentric transmission line having a grounded outer conductor and an inner conductor connected to said element, condenser means connecting the opposite ends of said element to ground to render said element resonant at a predetermined frequency other than the natural frequency of said element and to present to said transmission line a resistance substantially equal to the characteristic impedance thereof, and a cover sheet of nonmetallic material disposed over said opening in substantially coplanar relation with said skin to close said opening and provide a smooth air-flow surface.

7. An antenna structure for an aircraft having a metal skin and an opening therein, comprising an elongate antenna element disposed within said aircraft opposite said opening, a substantially semicylindrical metallic structure surrounding said element and grounded to said skin with the open side of said structure facing said opening to form a reflector and shield for said element, means for connecting said element to a translating device within said aircraft including a concentric transmission line having a grounded outer conductor and an inner conductor connected to said element, condenser means connecting an end of said element remote from said transmission line to ground, inductance means connecting the opposite end of said element to ground, said condenser and inductance means having impedance values to render said element resonant at a frequency other than the natural frequency of said element and to present to said transmission line a resistance substantially equal to the characteristic impedance thereof, and a cover sheet of nonmetallic material disposed over said opening in substantially coplanar relation with said skin to close said opening and provide a smooth airflow surface.

8. An antenna structure for an aircraft having a metal skin and an opening therein, comprising an elongate antenna element disposed within said aircraft opposite said opening, a substantially semicylindrical metallic structure surrounding said element and grounded to said skin with the open side of said structure facing said opening to form a reflector and shield for said element, means for connecting said element to a translating device within said aircraft including a concentric transmission line having a grounded outer conductor and an inner conductor connected to said element, the connection of said inner conductor to said element including first condenser means, second condenser means connected in series with said first condenser means for connecting one end of said element to ground, third condenser means connecting the opposite end of said element to ground, said several condenser means having impedance values to render said element resonant at a frequency other than the natural frequency of said element, the impedance of said third condenser means being substantially equal to the total impedance of said series connected first and second condenser means to provide a current maximum at the center of said element, said series connected first and second condenser means having relative impedance to present to said transmission line a resistance substantially equal to the characteristic impedance thereof, and a cover sheet of nonmetallic material disposed over said opening in substantially coplanar relation with said skin to close said opening and provide a smooth air-flow surface.

9. An antenna structure for an aircraft having a metal skin and an opening therein, comprising an elongate antenna element disposed within said aircraft opposite said opening, a substantially semicylindrical metallic structure surrounding said element and grounded to said skin with the open side of said structure facing said opening to form a reflector and shield for said element, means for connecting said element to a translating device within said aircraft inculding a concentric transmission line having a grounded outer conductor and an inner conductor connected to said element, said inner conductor being connected to said element at a point along the length thereof selected to provide an impedance match, impedance loading means connecting to ground the end of said element remote from said transmission line to render said element resonant at a frequency other than the natural frequency of said element, and a cover sheet of non-metallic material disposed over said opening in substantially coplanar relation with said skin to close said opening and provide a smooth air-flow surface.

10. An antenna structure for an aircraft having a metal skin and an opening therein, comprising an elongate antenna element disposed within said aircraft opposite said opening, a substantially semicylindrical metallic structure surrounding said element and grounded to said skin with the open side of said structure facing said opening to form a reflector and shield for said element, means for connecting said element to a translating device within said aircraft including a concentric transmission line having a grounded outer conductor and an inner conductor connected to said element, and condenser means connecting the opposite ends of said element to ground to render said element resonant at a predetermined frequency other than the natural frequency of said element and to present to said transmission line a resistance substantially equal to the characteristic impedance thereof.

11. An antenna structure for an aircraft having a metal skin and an opening therein, comprising an elongate antenna element disposed within said aircraft opposite said opening, a substantially semicylindrical metallic structure surrounding said element and grounded to said skin with the open side of said structure facing said opening to form a reflector and shield for said element, means for connecting said element to a translating device within said aircraft including a concentric transmission line having a grounded outer conductor and an inner conductor connected to said element, condenser means connecting an end of said element remote from said transmission line to ground, and inductance means connecting the opposite end of said element to ground, said condenser and inductance means having impedance values to render said element resonant at a frequency other than the natural frequency of said element and to present to said transmission line a resistance substantially equal to the characteristic impedance thereof.

12. An antenna structure for an aircraft having a metal skin and an opening therein, comprising an elongate antenna element disposed within said aircraft opposite said opening, a substantially semicylindrical metallic structure surrounding said element and grounded to said skin with the open side of said structure facing said opening to form a reflector and shield for said element, means for connecting said element to a translating device within said aircraft including a concentric transmission line having a grounded outer conductor and an inner conductor connected to said element, the connection of said inner conductor to said element including first condenser means, second condenser means connected in series with said first condenser means for connecting one end of said element to ground, and third condenser means connecting the opposite end of said element to ground, said several condenser means having impedance values to render said element resonant at a frequency other than the natural frequency of said element, the impedance of said third condenser means being substantially equal to the total impedance of said series connected first and second condenser means to provide a current maximum at the center of said element, said series connected first and second condenser means having relative impedances to present to said transmission line a resistance substantially equal to the characteristic impedance thereof.

13. An antenna structure for an aircraft having a metal skin and an opening therein, comprising an elongate antenna element disposed within said aircraft opposite said opening, a substantially semicylindrical metallic structure surrounding said element and grounded to said skin with the open side of said structure facing said opening to form a reflector and shield for said element, means for connecting said element to a translating device within said aircraft including a concentric transmission line having a grounded outer conductor and an inner conductor connected to said element, said inner conductor being connected to said element at a point along the length thereof selected to provide an impedance match, and impedance loading means connecting to ground the end of said element remote from said transmission line to render said element resonant at a frequency other than the natural frequency of said element.

BRUCE E. MONTGOMERY.

REFERENCES CITED

The following references are of record in the file of this patent:

UNITED STATES PATENTS

| Number | Name | Date |
| --- | --- | --- |
| 2,368,663 | Kandoian | Feb. 6, 1945 |
| 2,242,200 | Woods | May 13, 1941 |
| 2,195,232 | Wells | Mar. 26, 1940 |